United States Patent [19]
Gerber

[11] 3,810,414
[45] May 14, 1974

[54] METHOD FOR GENERATING CONTOURED PART HOLDERS

[75] Inventor: Heinz Joseph Gerber, West Hartford, Conn.

[73] Assignee: The Gerber Scientific Instrument Company, South Windsor, Conn.

[22] Filed: July 26, 1972

[21] Appl. No.: 275,413

[52] U.S. Cl............... 90/11 C, 90/13 R, 90/13 C, 33/1 M, 112/121.12
[51] Int. Cl............................................. B23c 1/16
[58] Field of Search............... 90/13 C, 11 C, 13 R; 33/1 M, 18 R, 23 C; 408/3, 26, 28, 30; 112/121.12

[56] References Cited
UNITED STATES PATENTS

| | | | |
|---|---|---|---|
| 3,611,874 | 10/1971 | Larsen | 90/13 C |
| 3,208,414 | 9/1965 | Reeber et al. | 112/121.12 |
| 3,376,836 | 4/1968 | Nicolay | 112/121.12 X |
| 3,626,799 | 12/1971 | Gerber | 112/121.25 X |
| 587,615 | 7/1897 | Stuart | 112/129 X |

*Primary Examiner*—Gil Weidenfeld
*Attorney, Agent, or Firm*—McCormick, Paulding & Huber

[57] ABSTRACT

A method for generating contoured clamp members for part holders in an automatic sewing apparatus employs the sewing apparatus itself and a cutting tool such as a small motor-driven cutting wheel attached to the apparatus. The contour on a clamp member which later will form a portion of a part holder is generated by utilizing the same program tape as that used to control the relative motions of the part holder during a sewing operation. In carrying out the method, a non-contoured clamp member is positioned in the sewing apparatus and then the program tape controls the motions of the non-contoured clamp member relative to the cutting wheel so that the displacement routine followed is the same as in a sewing operation. The resulting contour formed by the cutting wheel on the clamp member is similar to the stitch path followed by the sewing apparatus on a collar, cuff, or other workpiece sewn by the apparatus.

9 Claims, 4 Drawing Figures

METHOD FOR GENERATING CONTOURED PART HOLDERS

BACKGROUND OF THE INVENTION

The present invention relates to the field of automated tools and equipment and, more particularly, it is concerned with the method of generating a contoured part holder in the same programmed apparatus which will utilize the part holder to hold a workpiece in subsequent work routines.

In some automatic tooling operations, it is necessary to employ specially contoured part holders to provide complete support for a workpiece as it is operated upon by the tool. It is particularly desirable to utilize contoured part holders in automatic sewing apparatus since the materials worked on are generally limp and not capable of supporting themselves with sufficient rigidity for accurate location relative to a stitching needle. For example, to sew the "finish" stitching along the periphery of a shirt collar or cuff with an automatic sewing apparatus, it is necessary to grip the cloth forming the collar or cuff close to the periphery where the stitch path will lie. Clamp members in which the limp cloth material is sandwiched during the stitching operation must have a contour closely approaching the stitch path to provide adequate support. Since collars, cuffs and other articles of apparel are produced in various sizes and shapes, different sets of contoured clamp members are needed for supporting all workpieces in optimum fashion.

The generation of contoured surfaces on clamp members is not new; however, it can be an expensive operation. In the case of the clothing industry, costs may be prohibitive because of the range of sizes and different styles of clothing manufactured. Since styles change frequently, the useful lifetime of a contoured member may be relatively short. Because of the large number and the limited life, it is desirable to have a relatively inexpensive method of manufacturing the members.

It is, accordingly, a general object of the present invention to disclose a method for manufacturing contoured clamp members by means of the same automatically controlled apparatus which uses the clamp members to hold a workpiece during the programmed work routine of the apparatus.

SUMMARY OF THE INVENTION

The present invention relates to a method for generating contoured clamp members which support a workpiece in a programmed apparatus as the apparatus executes its programmed work routine. The apparatus would normally have a chuck for holding the clamp member and workpiece as a work tool in the apparatus and the workpiece are moved relative to one another along a line defined by the program. For example, the apparatus might be an automatically controlled sewing apparatus which follows a stitch path along the periphery of a shirt collar. The clamp members hold the collar during the stitching operation and have a conforming contour allowing the peripheral edges of the collar to be exposed.

The novel method generally begins by positioning a noncontoured clamp member on which the contour is desired in the programmed apparatus which normally receives a contoured clamp and a workpiece. A tracking tool is attached to the programmed apparatus and then the apparatus is operated to produce relative movements between the non-contoured clamp member and the tracking tool in accordance with the apparatus program. Since the movements are controlled by the same program used in a normal work routine, the tracking tool follows a path similar to the line normally followed by the work tool. Cutting the non-contoured clamp member along the path followed by the tracking tool produces a contour similar to the line normally followed in the programmed work routine. In one form of the invention, the tracking tool itself is a cutting tool, such as a milling wheel, and the wheel carries out the cutting operation as the programmed apparatus produces the relative movements.

One advantage of the invention is that it is relatively inexpensive since the apparatus and program which produce the contoured clamp members are basically the same as that used in the normal work routine.

DESCRIPTION OF THE PREFERRED EMBODIMENTS

Figure 1:
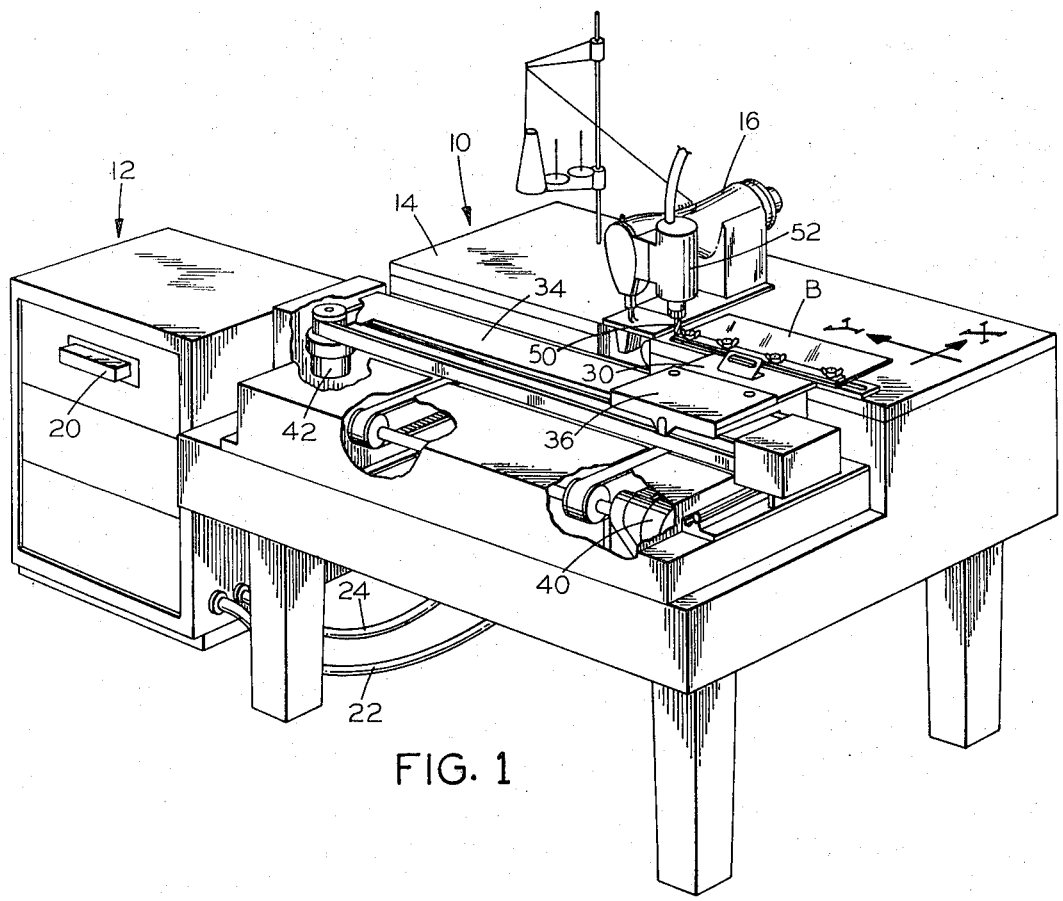
FIG. 1 is a perspective view of a numerically controlled sewing apparatus for carrying out the present invention.

FIG. 1 shows the principal components of a numerically controlled sewing apparatus in which the present invention may be carried out. The sewing apparatus, generally designated 10, includes a control computer 12 and a sewing table 14 on which a sewing machine 16 is mounted. The control computer 12 has a tape reader 20 through which a program tape defining a sewing routine is fed. The computer 12 takes information from the program tape and converts it to commands intelligible to the components on the sewing table 14 and the commands are supplied to the components through a command signal cable 22. In order to coordinate the operations of the computer 12 and the components, the computer receives information from the sewing table through a sensor signal cable 24.

In a sewing operation, a workpiece, such as a layup of cloth forming a shirt collar, is installed in a part holder 30 and is translated under a work tool, the stitching needle of the sewing machine 16, by a set of movable carriages 34 and 36. The carriage 34, hereafter called the X carriage, is mounted on the sewing table 14 for movement relative to the sewing machine 16 in the illustrated X coordinate direction. An X drive motor 40 is connected to the X carriage 34 by means of a system of toothed belts and pulleys to produce the movements. The carriage 36, hereafter called the Y carriage 36, is mounted on the X carriage 34 for movement relative to the X carriage and the sewing table 14 in the illustrated Y coordinate direction. A Y drive motor 42 mounted on the X carriage 34 is connected to the Y carriage 36 by means of a toothed belt and pulleys to move the carriage 36 relative to the sewing machine 16 in the Y direction. Both the X drive motor 40 and the Y drive motor 42 are controlled by commands from the control computer 12. Programmed composite movements of the X and Y carriages move a workpiece installed in the part holder 30 relative to the sewing machine 16 and effectively cause the stitching point of the sewing machine to move along a desired stitching path on the workpiece.

The operation of sewing machine 16 is also normally coordinated with the operations of the control computer 12. For a more complete description of the sewing operation and details of the sewing apparatus 10, reference may be had to the copending U.S. Pat. application Ser. No. 131,285 filed Apr. 5, 1971 now U.S. Pat. No. 3,725,098 and having the same assignee as the present invention.

Turning more specifically to the present invention, it is necessary to hold a layup of cloth or other limp material close to the desired stitch path in order to position the material accurately under the needle of the sewing machine 16 during the sewing operation. To accurately position cloth which is to be sewn into a collar or other article of clothing having stitching along the peripheral edge of the piece, it is desirable to have a clamp member which extends into close proximity to the peripheral edge without overlying the stitch path. Such a clamp member, therefore, must have a contour approximating that of the stitch path or the periphery of the article. It will be understood that to sew articles of different sizes or styles, many different contoured clamp members may be needed. The manufacture of many different clamp members may be quite expensive if they are formed by hand or if special machine tool programs are made for each contour. In accordance with the present invention, the machining operation employs the same program tape as that utilized to sew the article itself. There is no need to generate a special program tape. In addition, the machining operation is carried out by the sewing apparatus with slight modifications.

In particular, a small, rotatable cutting tool 50, such as a milling wheel, and a tool drive motor 52 are attached to the housing of the sewing machine 16 so that the tool rotates about a vertical axis offset from and parallel to the needle in the sewing machine 16. A blank clamp member B without a proper contour is then positioned in the base portion of a part holder 30. After introducing in the sewing program a compensating factor corresponding to the offset of the tool and the needle, the sewing apparatus is started and caused to produce relative movements between the non-contoured clamp member and the cutting tool in accordance with the sewing program. The tool 50 is effectively guided along a path over a workpiece similar to the stitching path normally followed by the needle during a sewing routine and if a milling wheel is driven by the motor 52 during the relative movements, a contour corresponding to the stitch path is generated by the wheel on the clamp member.

Figure 2:
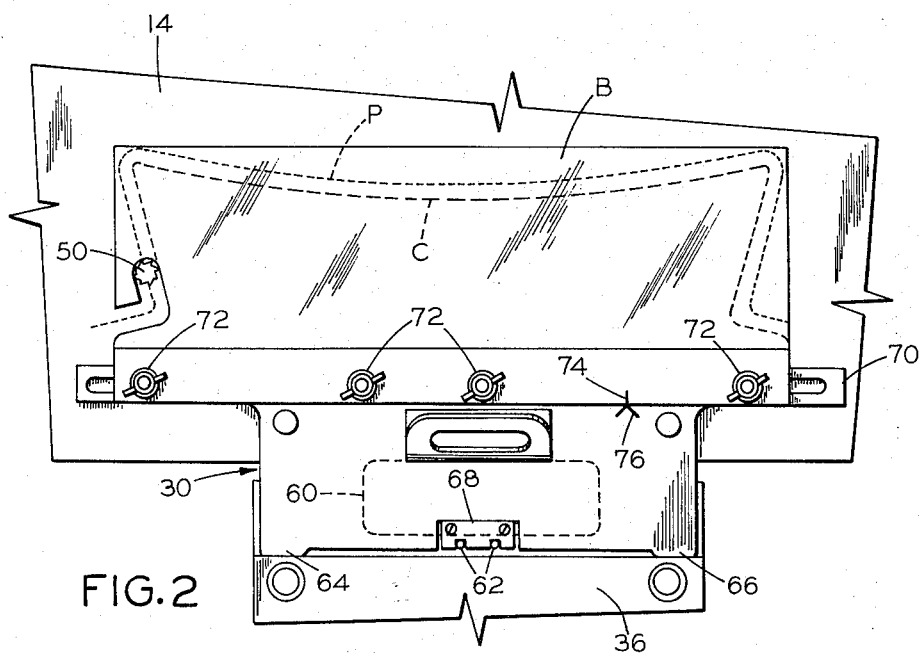
FIG. 2 is a plan view of a holder and non-contoured clamp member in the sewing apparatus of FIG. 1 during a cutting operation.
Figure 3:
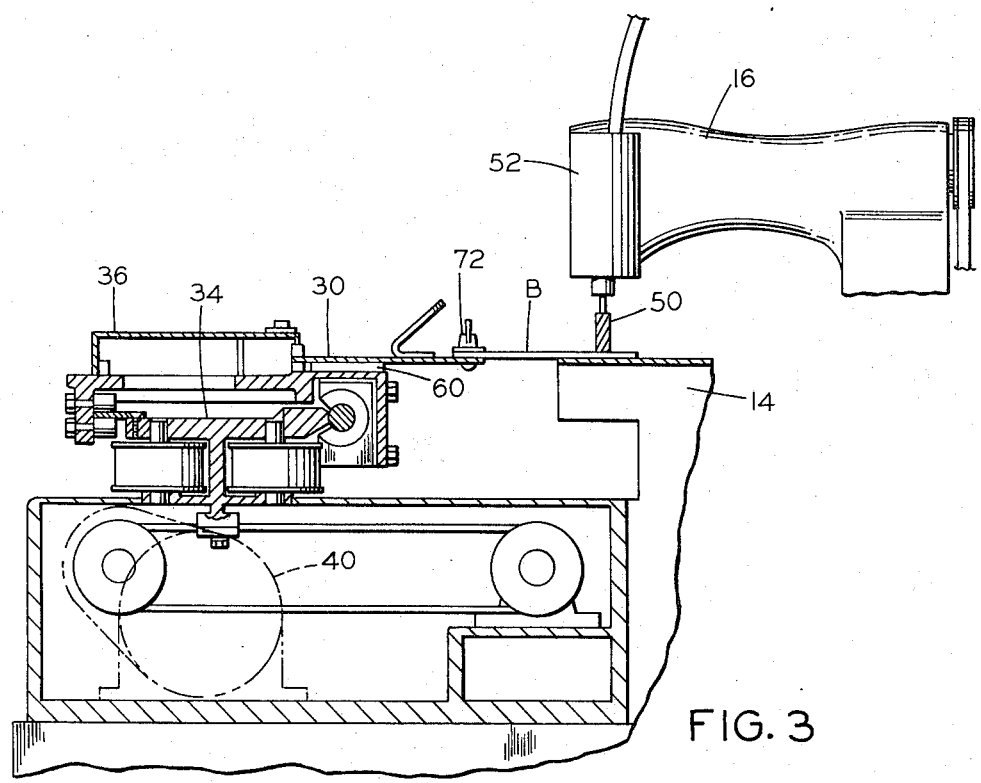
FIG. 3 is a fragmentary side elevation view of the sewing apparatus and a clamp member during a cutting operation.

In FIGS. 2 and 3, the base portion of a part holder 30 is shown during a cutting operation with a non-contoured clamping member B made, for example, from a clear plastic plate. A stitch path P in FIG. 2 normally followed by the needle of the sewing machine 16 is indicated with respect to the part holder 30 by means of a dotted line. With the computer 12 compensating for the offset of the needle and tool 50, the center of the vertical axis about which the tool rotates will track the path P as shown. The contour C cut on the blank clamp member B is indicated partially by a dotted line which is at each point spaced from the stitch path P by an amount equal to the radius of the tool 50. It will, therefore, be understood, that when the contoured clamp member B is subsequently utilized in a sewing operation, the clamp member will extend into close proximity to a line of stitching which is produced along the peripheral region of a collar or other article being sewn because the same program tape and apparatus which produce the stitch path P also produced the contour C. To manufacture clamp members for other sizes or styles of collars, it is only necessary to substitute in the control computer 12 the sewing program for the particular size or style in question.

Compensating for the offset relationship of the sewing needle and the cutting tool 50 is relatively simple with numerically controlled computers since it generally entails dialing in or presetting the computer so that the displacement program followed by the movable carriages begins at a new or different starting point. In the embodiment illustrated in FIG. 1, for example, the milling wheel 50 rotates about an axis displaced a fixed amount from the needle in the Y direction. Compensating for this displacement would merely require that a position preset be introduced into the Y-axis control channel. The relative movements between the Y carriage 36 and the sewing machine 16 which cause the needle to track the stitch path P are then initiated with the Y carriage 36 displaced on the X carriage by an amount corresponding to the offset so that the center of the cutting wheel with respect to the part holder 30 at the start of a cutting operation is at the same position as the needle at the start of a sewing routine. Of course, if the sewing machine 16 is adapted to mount the cutting wheel at the needle position, there is no need to introduce any compensation. With the sewing apparatus illustrated in FIG. 1, it may be necessary to remove the needle and presser foot if during the cutting operation the clamp member B moves toward the machine in the Y coordinate direction by an amount which would otherwise cause interference with the needle and foot. Conversely, the cutting tool 50 and possibly the drive motor 52 are removed during sewing operations.

Another manner of compensating for the offset of the needle and cutting tool in the sewing apparatus of FIG. 1 without presetting the computer program is to initially mount the blank member B to the Y carriage 36 with an offset equal to that of the needle and cutting tool. The offset mounting can be achieved by either shifting the blank clamp member B relative to the base of the part holder 30 or by mounting the base of the part holder at an offset position on the Y carriage 36. The apparatus shown in FIGS. 1–3 is designed so that the part holder 30 is always positioned at the same location on the Y carriage 36 and the holder permits parallel shifting of the blank clamp member B in the Y direction relative to the carriage 36. In particular, the Y carriage 36 has a magnetic chuck 60 and a pair of alignment pins 62. A pair of bosses 64 and 66 and an alignment bushing 68 engageable with the alignment pins 62 fix the part holder 30 in a predetermined position on the carriage 36 before the magnetic chuck 60 is energized. A slotted guide bar 70 on the base portion of the part holder receives a plurality of wing nuts 72 which hold the clamp member B during the cutting operation. When a non-contoured member B is initially installed in the part holder, the member and the wing nuts are shifted in the slot of the bar 70 parallel to the Y coordinate direction by an amount equal to the offset between the sewing needle and the cutting wheel. This shifting moves the member from a normal sewing position indicated by alignment of index marks 74 and 76 to a cutting position. The programmed movements of the Y carriage 36 relative to the sewing machine 16 are then the same as in a sewing operation but the cutting tool and the clamp member operate in cutting engagement at a work point offset from the stitch point in the sewing operation.

Figure 4:
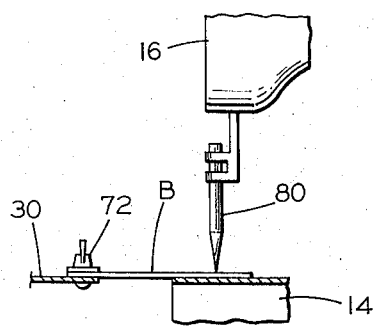
FIG. 4 is a fragmentary cross-sectional view of the sewing apparatus showing a non-contoured clamp member being marked in accordance with one embodiment of the present invention.

In another form of the present invention, the same program tape which controls the sewing routine may be used to generate the clamp member contour but the actual cutting operation is performed apart from the sewing apparatus 10. In FIG. 4, a marking tool 80, such as a pencil, awl or other scribing instrument, is attached to the sewing machine 16 in place of the needle or in an offset position as is the cutting wheel 50 in FIG. 1. The program tape in the control computer 12 then causes the relative movements between the clamp member B and the sewing machine 16 so that the tool 80 tracks the stitch path P shown in FIG. 2 and leaves a trace or visible record of the path on the clamp member. The member is then taken from the part holder 30 and is cut at a station remote from the sewing apparatus 10 by moving a cutting wheel along the record of the stitch path produced by the marking tool 80.

From the above description it will be readily understood that a method for generating contoured clamp members is disclosed in which the programmed apparatus normally used to perform a work operation is also employed to produce the clamp member contour. With a non-contoured clamp member positioned in the apparatus, a tracking tool is guided along a path similar to that normally followed by a work tool in the apparatus. The tracking tool may be either a cutting tool, so that the cutting of the contour occurs simultaneously with the tracking operation, or may be marking tool to permit the cutting operation to be carried out at a subsequent time. The tracking tool may be attached to the programmed apparatus either at the same point as that normally occupied by the work tool or at an offset position. With the tracking tool in the offset position, a compensation must be made either in the apparatus program or by offsetting the clamp member a corresponding amount.

While the present invention has been described in several forms, it should be understood that numerous modifications and substitutions can be made without departing from the spirit of the invention. The method can be used to make clamp members from programmed apparatus other than sewing apparatus with equally satisfactory results. The memory device on which the work routine is programmed need not necessarily be a memory tape and may include a cam or combinations of various memory devices. Several clamp members may be cut in a single operation by stacking the non-contoured members upon one another. It is also not material to the invention that the clamp members be moved relative to a stationary cutting tool since the positions of the tool and clamp member can be reversed with similar results. Accordingly, the present invention has been described in several forms by way of illustration rather than limitation.

I claim:

1. A method of operating a programmed apparatus having a chuck for holding a clamp member and workpiece as a work tool in the apparatus and the workpiece are moved relative to one another along a line followed in a programmed work routine comprising the steps of: positioning a non-contoured clamp member in the chuck of the programmed apparatus; attaching a tracking tool to the programmed apparatus; causing the programmed apparatus to produce relative movements between the non-contoured clamp member and the tracking tool in accordance with the apparatus program to guide the tracking tool relative to the non-contoured clamp member along a path similar to the programmed line followed by the work tool in the work routine; cutting the noncontoured clamp member along the path followed by the tracking tool to produce a contour similar to the line followed in the programmed work routine; then clamping a workpiece to the chuck of the programmed apparatus by means of the same clamp member which receives the contour during the step of cutting; and then performing a programmed work routine by moving the work tool and the workpiece clamped to the chuck by the clamp member relative to one another along the programmed line and operating upon the workpiece with the work tool.

2. A method as defined in claim 1 wherein: the step of attaching comprises attaching a tracking tool to the programmed apparatus in the position normally occupied by the work tool.

3. A method as defined in claim 1 wherein: the step of attaching comprises attaching a cutting tool to the programmed apparatus; the step of causing comprises guiding the cutting tool along the path in accordance with the apparatus program; and the step of cutting is performed simultaneously with the guiding of the cutting tool and comprises operating the cutting tool in engagement with the non-contoured clamp member.

4. A method as defined in claim 3 wherein: the step of attaching comprises attaching a milling wheel and drive motor connected to the milling wheel to the programmed apparatus.

5. A method as defined in claim 1 wherein: the step of attaching comprises attaching the tracking tool to the programmed apparatus in offset relationship to the normal position of the work tool in the apparatus.

6. A method as defined in claim 5 wherein: the step of positioning the noncontoured clamp member comprises positioning the non-contoured clamp member in the chuck in an offset relationship paralleling the offset relationship of the tracking tool.

7. A method as defined in claim 5 wherein the step of causing includes: introducing into the program in the apparatus a compensating factor corresponding to the offset relationship of the tracking tool.

8. A method as defined in claim 1 wherein: the step of attaching a tracking tool comprises attaching a marking tool to the programmed apparatus to leave a record of the path tracked on the clamp member during the step of causing; and the step of cutting comprises cutting the non-contoured member along the path in accordance with the record left by the marking tool.

9. A method as defined in claim 8 wherein: the step of attaching comprises attaching a scribing instrument to the programmed apparatus to produce a visible record of the tracked path.

* * * * *